United States Patent [19]

Pietrzak et al.

[11] Patent Number: 4,852,706
[45] Date of Patent: Aug. 1, 1989

[54] GATE OPERATOR

[76] Inventors: Edward Pietrzak, 3612 Cummings, Berkley, Mich. 48072; James M. Ihm, 22317 St. Gertrude, St. Clair Shores, Mich. 48081

[21] Appl. No.: 92,240

[22] Filed: Sep. 2, 1987

[51] Int. Cl.$^4$ ............................................. F16D 7/02
[52] U.S. Cl. .................................... 192/8 R; 192/20; 192/56 R; 464/46; 74/425
[58] Field of Search ............ 192/8 R, 17 C, 20, 56 R, 192/150; 464/45, 46, 47, 48; 74/425, 814; 49/26, 139, 141, 334, 337

[56] References Cited

U.S. PATENT DOCUMENTS

| | | | |
|---|---|---|---|
| 2,560,238 | 7/1951 | Nouzak | 192/150 |
| 2,591,693 | 4/1952 | Gatesy | 49/139 |
| 2,693,684 | 11/1954 | Yates | 464/45 |
| 2,699,856 | 1/1955 | McCann | 464/45 |
| 3,059,485 | 10/1962 | Bohlman et al. | 49/139 |
| 3,470,653 | 10/1969 | Kalog | 49/141 |
| 4,730,513 | 3/1988 | Heinrich et al. | 49/141 |
| 4,741,226 | 5/1988 | Bernard et al. | 192/56 R |

Primary Examiner—Rodney H. Bonck
Assistant Examiner—David A. Testardi
Attorney, Agent, or Firm—Krass & Young

[57] ABSTRACT

An operator mechanism for a sliding gate including an electric motor driving a speed reducer through a worm gear and worm wheel arrangement and a multi-disk clutch positioned within the housing of the speed reducer. A sprocket wheel is positioned on one end of the output shaft of the speed reducer and a clutch operator member is slidably mounted on the other end of the output shaft. A disconnect mechanism is provided in association with the collar to move the collar in a macro sense to engage and disengage the clutch, and an adjustment mechanism is also provided in association with the collar to move the collar in a micro sense to adjust the load at which the clutch will slip when encountering an obstacle. The disconnect mechanism may be operated without disturbing the setting of the adjustment mechanism.

24 Claims, 2 Drawing Sheets

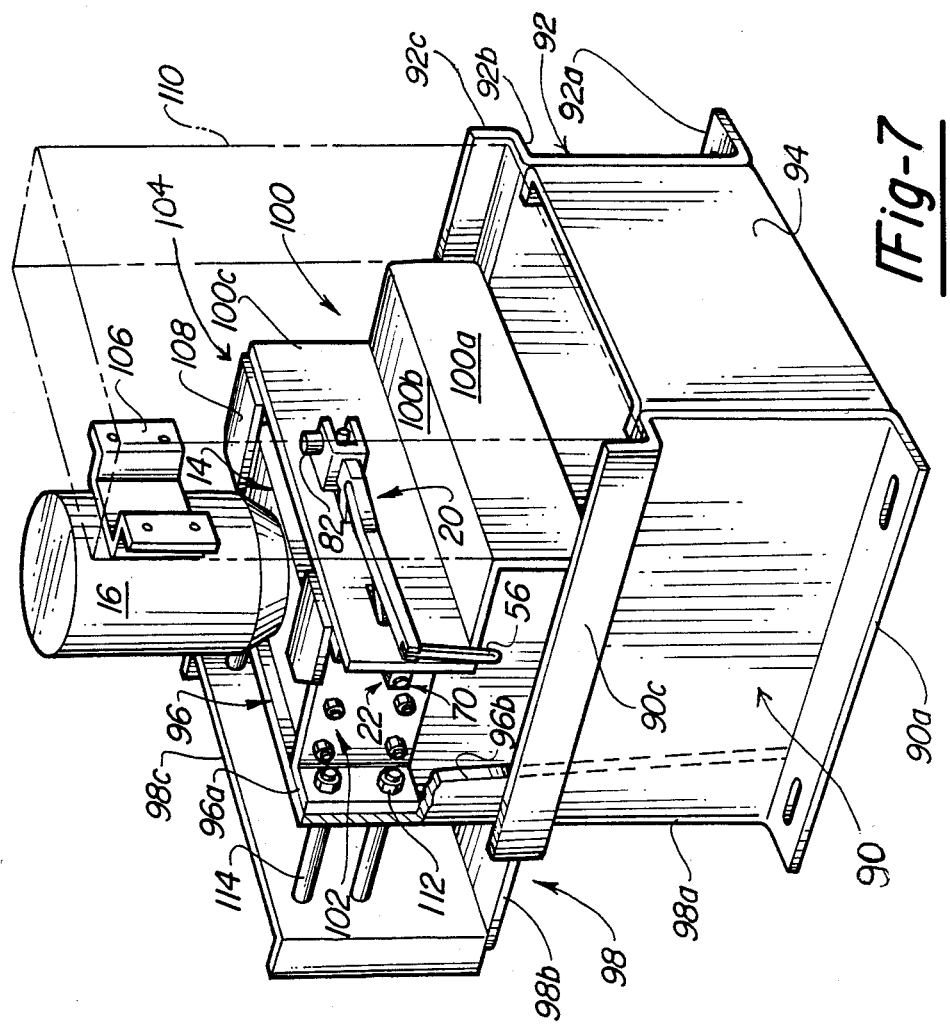
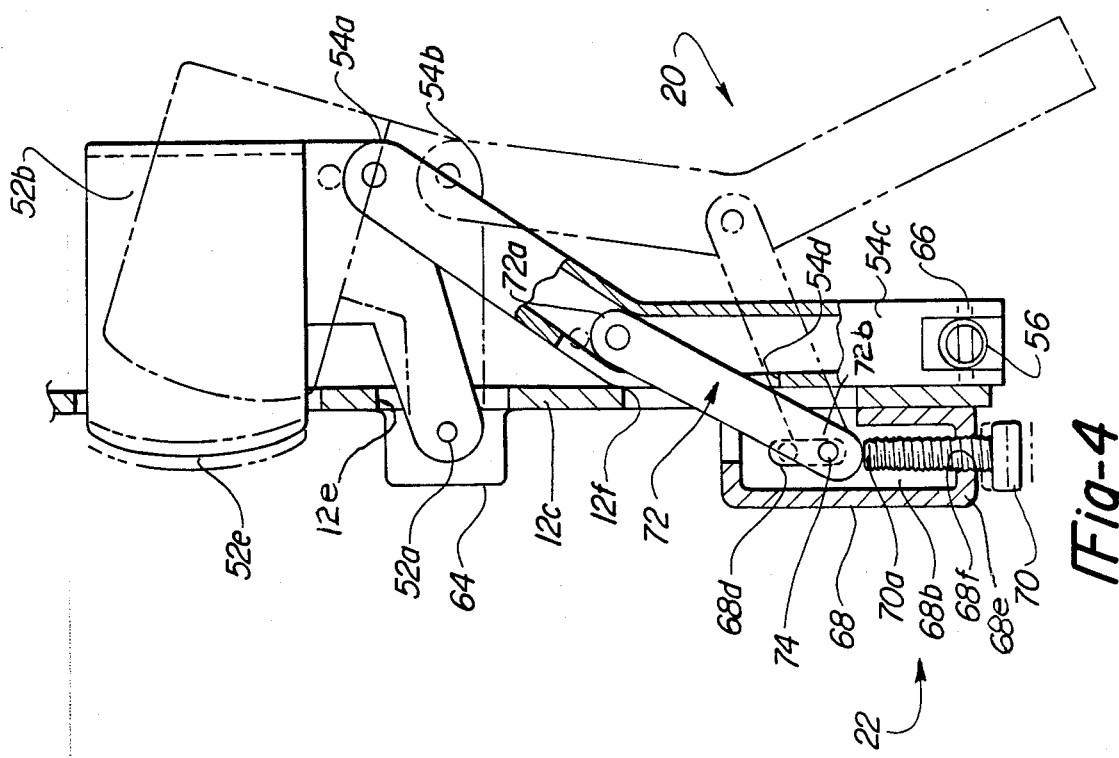

GATE OPERATOR

BACKGROUND OF THE INVENTION

This invention relates to operator mechanisms and more particularly to an operator for use in opening a gate.

Many forms of operator mechanisms for opening and closing slidably mounted gates have been proposed and implemented. Whereas these operator mechanisms have been generally satisfactory, they have suffered from one or more disadvantages. Specifically, the prior art sliding gate operator mechanisms have tended to be rather high maintenance units, particularly as regards the pulleys and belts commonly employed as the drive mechanism in these units. Further, the process of adjusting the operator mechanism to provide the desired movement to the associated gate and to provide the desired slippage when encountering an obstacle has been unduly complicated in the prior art units. Further, the prior art units have been relatively difficult to disconnect from the gate to allow manual operation of the gate in the event of power failure or malfunction of the gate operator. Further, the prior art units have presented a somewhat cluttered, aesthetically displeasing appearance, inconsistent with the otherwise aesthetically attractive environments in which they are commonly utilized.

SUMMARY OF THE INVENTION

This invention is directed to the provision of a gate operator having improved maintenance characteristics.

This invention is further directed to the provision of a gate operator which may be readily adjusted to provide the desired movement of the associated gate and to provide the desired slippage when encountering an obstacle.

This invention is further directed to the provision of a gate operator which may be readily disconnected from the associated gate.

This invention is further directed to the provision of a gate operator which presents a neat and aesthetically pleasing appearance.

The gate operator according to the invention comprises an electric motor; a drive shaft driven by the motor; a drive member on the drive shaft for driving the gate; a clutch interposed between the motor and the drive shaft; a clutch operator member operative in response to macro movement thereof to engage and disengage the clutch and operative in response to micro movement thereof with the clutch engaged to adjust the load at which the clutch slips; disconnect means operative to impart macro movement to the operator member to engage and disengage the clutch; and adjustment means operative independently of the disconnect means to impart micro movement to the operator member to adjust the load at which the engaged clutch slips. This arrangement provides a compact and efficient operator package wherein the clutch disconnect and the clutch adjustment functions are readily accomplished and operate through a common clutch operator member.

According to a further feature of the invention, the clutch comprises a multi-disk assembly including a plurality of annular pressure plates mounted concentrically on and keyed to the drive shaft and a plurality of annular friction disks interposed between the pressure plates; and the operator member comprises a collar mounted on the drive shaft and movable axially on the drive shaft to variably load the friction disks relative to the pressure plates. This arrangement provides a compact and efficient arrangement for disengaging the clutch and adjusting the clutch through a common operator member.

According to a further feature of the invention, the clutch further includes a wheel rotatably mounted on the drive shaft in interposed relation to the pressure plates and the friction disks and driven by the motor. This arrangement provides a convenient clutch package and further contributes to the compact and efficient packaging of the overall apparatus.

According to a further feature of the invention, the wheel comprises a worm wheel and the output shaft of the motor drives a worm gear drivingly engaging the worm wheel. This arrangement provides a convenient and compact package for providing the required speed reduction for the unit.

According to a further feature of the invention, the disconnect means includes an operating lever operable to impart the macro disconnect movement to the collar to engage and disengage the clutch and the adjustment means comprises an adjustment screw operative to impart the adjusting micro movement to the collar to adjust the clutch.

According to a further feature of the invention, the disconnect means further includes a clamp head adapted to engage the collar and mounted for pivotal movement between the clutch engage and clutch disengage position; and the operating lever is pivoted at one end to the clamp head and is operative to pivot the clamp head between it clutch engage and clutch disengage positions. This arrangement provides a convenient and efficient disengage assembly.

According to a further feature of the invention, the operator further includes an adjustment link pivotally mounted at one end thereof to the operating lever intermediate the ends of the operating lever, and the adjustment screw engages the other end of the adjustment link. With this arrangement, rotation of the adjustment screw moves the one end of the adjustment link which in turn moves the operating lever which in turn pivots the clamp head which in turn moves the collar, whereby the clutch is adjusted.

According to a further feature of the invention, the free end of the adjustment link includes a pin guiding in a slot extending parallel to the line of action of the adjustment screw. With this arrangement, the pin guides in the slot upon threaded adjusting movement of the screw to provide a positive initial movement of the adjustment link for ultimate transmittal to the collar to adjust the clutch.

According to a further feature of the invention, the worm wheel is part of a speed reducer unit further including a speed reducer housing; the drive shaft extends through the speed reducer housing with its opposite ends positioned outboard of the housing; the multi-disk clutch assembly is positioned within the housing; the drive member comprises a drive sprocket positioned on one end of the drive shaft outboard of the housing; and the collar is mounted on the other end of the drive shaft outboard of the housing. This arrangement provides a convenient and compact package for providing the required clutching and speed reducing functions for the operator mechanism.

According to a further feature of the invention, the speed reducer unit includes a bearing member in a side wall thereof passing and journalling the drive shaft and including a race mounted for axial movement on the shaft, and the operator further includes spring means on the shaft between the inboard face of the collar and the outboard face of the bearing member race operative to urge the inboard face of the race against the multi-disk clutch assembly positioned within the speed reducer housing. This arrangement provides a convenient means for transferring the outboard movement of the collar to inboard adjustment of the clutch mechanism.

According to a further feature of the invention, the operator mechanism further includes a tooth member mounted on the shaft and a solenoid having a plunger movable into locking interengagement with the tooth member, and the plunger is moved axially out of engagement with the tooth member in response to macro movement of the operator member in a clutch disengage direction. This arrangement allows the drive shaft to be positively locked when desired and ensures that the drive shaft will be unlocked at such time as the clutch mechanism is disengaged.

BRIEF DESCRIPTION OF THE DRAWINGS

FIGS. 4, 5 and 6 are enlarged detail fragmentary views of portions of the gate operator of FIGS. 1–3; and FIG. 7 is a view of a commercial embodiment of the invention gate operator.

DETAILED DESCRIPTION OF THE PREFERRED EMBODIMENT

Figure 1:
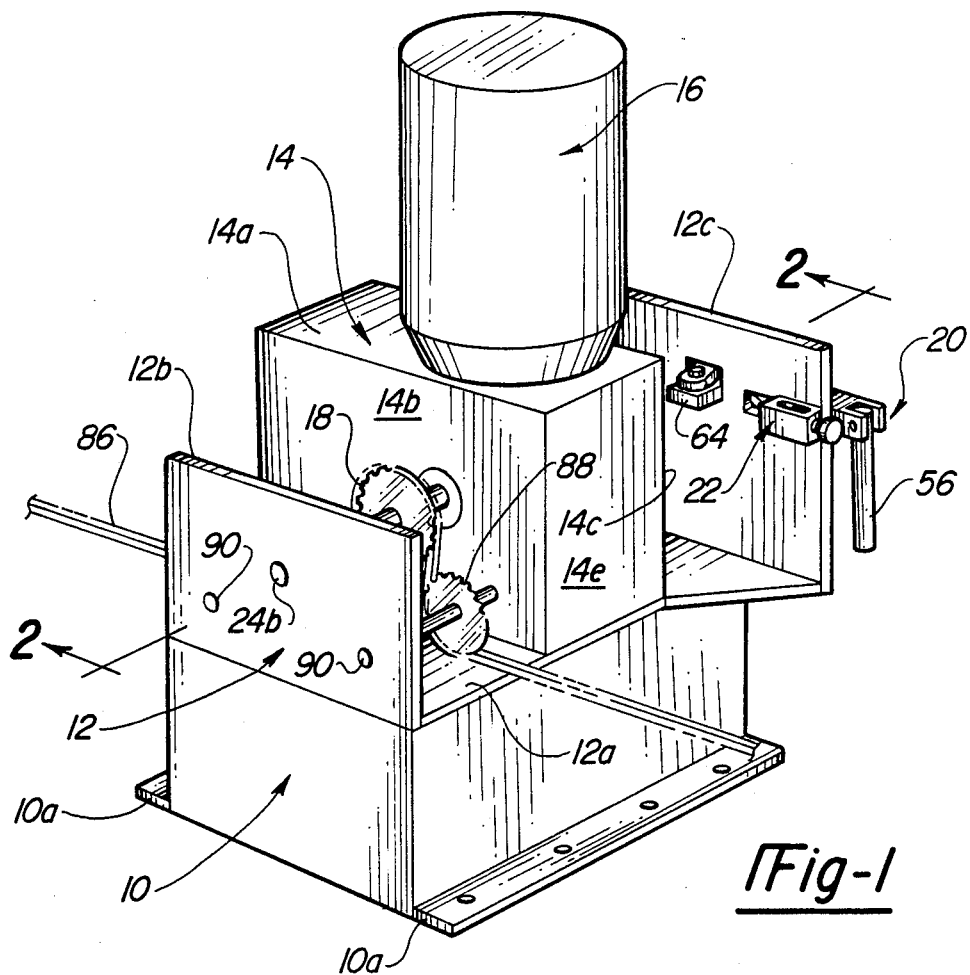
FIG. 1 is a perspective somewhat schematic view of a gate operator according to the invention.

The gate operator of the invention is intended for use with a sliding gate and, broadly considered, includes a base 10, a frame structure 12, a speed reducer unit 14, an electric motor 16, a drive sprocket 18, a disconnect mechanism 20, and an adjustment mechanism 22.

Figure 2:
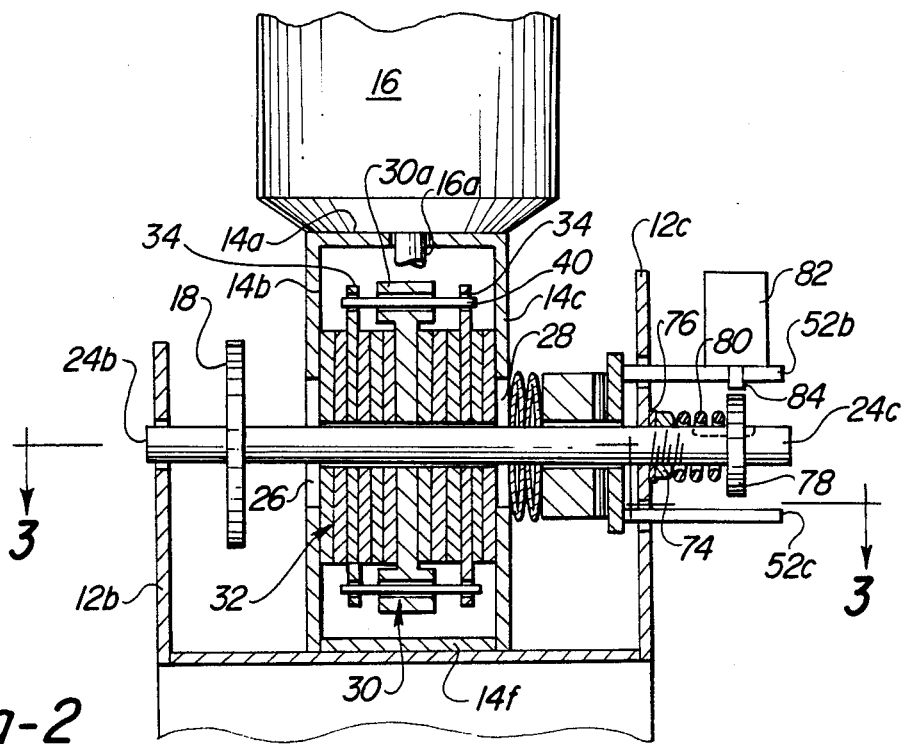
FIG. 2 is a cross-sectional view taken on line 2—2 of FIG. 1.
Figure 3:
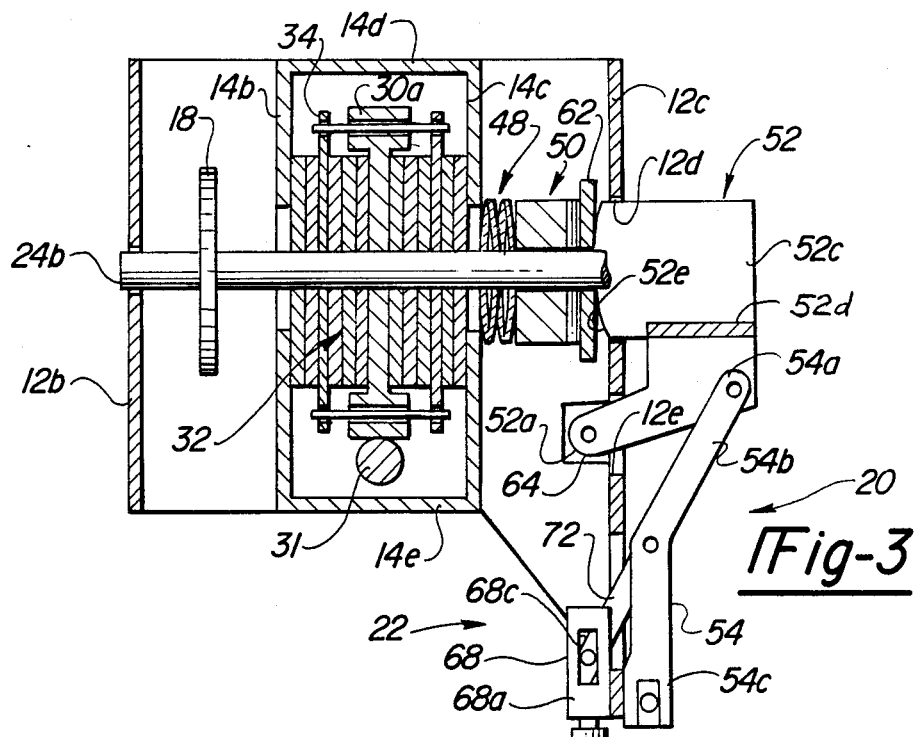
FIG. 3 is a cross-sectional view taken on line 3—3 of FIG. 2.
Figure 5:
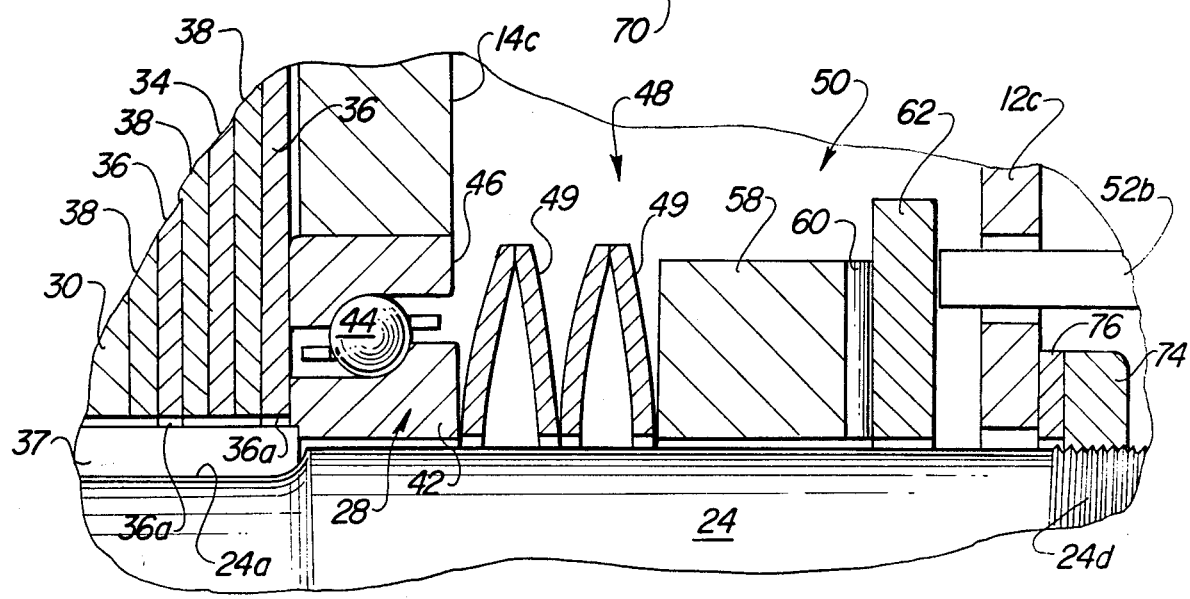
Figure 6:
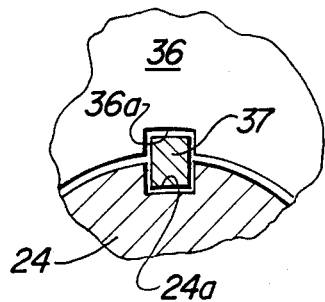

Base 10 and frame structure 12 are shown schematically in FIGS. 1–3 for purposes of operational clarity.

Base 10 comprises a suitable steel, box-like structure and includes flange portions 10a to facilitate bolting of the base to a suitable concrete pad positioned adjacent the gate to be operated by the operator mechanism.

Frame structure 12 includes a base plate 12a, an end wall 12b, and a further end wall 12c forming a support for disconnect mechanism 20 and adjustment mechanism 22. Frame structure 12 is suitably secured to and positioned on top of base 10 as illustrated.

Speed reducer 14 is mounted on frame 12; motor 16 is secured to the upper wall 14a of speed reducer 14; and disconnect mechanism 20 and adjustment mechanism 22 are mounted in association with frame wall portion 12c.

Speed reducer unit 14 includes a housing including top wall 14a, spaced side walls 14b and 14c, end walls 14d and 14e, and bottom wall 14f. Speed reducer unit 14 further includes a drive shaft 24 journalled in side walls 14b and 14c by ball bearings 26 and 28, and a worm wheel 30 positioned within the speed reducer housing in concentric freely rotatable relation to shaft 24. Worm wheel 30 is driven in known speed reducing manner by a worm gear 31 positioned on the free end of the output shaft 16a of motor 16 so that worm wheel 30 is driven at a reduced speed in response to actuation of motor 16.

A multi-disk clutch assembly 32 is positioned within the speed reducer housing and, specifically, between the opposite side walls 14b and 14c of the speed reducer housing. The speed reducer housing is filled with a suitable lubricant to provide an oil bath for the multi-disk clutch assembly.

Clutch assembly 32 includes a pair of floating pressure plates 34 positioned on opposite sides of worm wheel 30, four keyed pressure plates 36 suitably keyed to shaft 24, and a plurality of friction disks or pads 38. Keyed pressure plates 36 are keyed to shaft 24 by means of slots 36a received over a key 37 positioned in a shaft keyway 24a. Floating pressure plates 34 are mounted for rotation with worm wheel 30 by a plurality of pins 40 passing through an enlarged rim portion 30a of worm wheel 30 for engagement with the floating pressure plates so that pressure plates 34 are rotated together with worm wheel 30. A first keyed pressure plate 36 is positioned between the inboard face of bearing 28 and the left-hand floating pressure plate 34 as viewed in FIGS. 2 and 3; a second keyed pressure plate 36 is positioned between the left-hand floating pressure plate 34 and the left face of worm wheel 30; a third keyed pressure plate 36 is positioned between the right face of worm wheel 30 and the right floating pressure plate 34; and a fourth keyed pressure plate 36 is positioned between the right floating pressure plate 34 and the inboard face of bearing 26. Friction pads or disks 38 are interposed between each keyed pressure plate and the adjacent floating pressure plate and between each keyed pressure plate and the associated side face of the worm wheel. The composite axial width of the multi-disk clutch, including the worm wheel 30, is such as to fit snugly within the interior of the speed reducer housing between the inboard faces of side walls 14b and 14c.

Ball bearing assembly 28 includes an inner race 42 mounted for axial sliding movement on shaft 24; a plurality of spherical ball elements 44 suitably caged, and an outer race 46 positioned in housing side wall 14c. Ball bearing 26 has a similar construction.

Disconnect mechanism 20 is supported on frame end wall 12c and includes spring means 48; a clutch operator member assembly 50; a clamp head 52; an operating lever 54; and a handle 56.

Spring means 48 comprises a plurality of Bellville washers 49 in back-to-back pairs and mounted on shaft 24 immediately outboard of bearing 28.

Clutch operator member assembly 50 includes a clutch operator member in the form of a collar 58 slidably mounted on shaft 24 outboard of spring means 48, a needle bearing 60 mounted outboard of collar 58, and a thrust washer 62 mounted outboard of needle bearing 60.

Clamp head 52 comprises a lever pivotally mounted at one end 52a thereof on a bracket 64 carried on the inboard face of frame structure portion 12c and is bifurcated at its other end to define a pair of vertically spaced head plates 52b and 52c interconnected by a vertical wall portion 52d. Each head plate 52b, 52c includes an arcuate cam surface 52e for camming coaction with thrust washer 62. Head plates 52b and 52c pass through slots 12d in frame wall 12c for access to thrust washer 62 and clamp head 52 passes through a further slot 12e in wall portion 12 adjacent the pivoted end 52a of the clamp head.

Operating lever 54 is formed of rectangular tubular stock and is pivoted at one end 54a thereof to clamp head 52. Lever 54 has an angled configuration including a first portion 54b pivoted to clamp head 52 and a second remote portion 54c. Handle 56 is pivotally secured to the remote end of operating lever remote portion 54c by a pin 66 and is adapted to be moved between an inactive position in which it hangs limply from the remote end of lever portion 54c and an operative position in which it is raised pivotally to form an extension of lever 54 to increase the lever moment arm and thereby increase the force applied to the clamp head 52.

Adjustment mechanism 22 includes a bracket 68, an adjustment screw 70, and an adjustment link 72.

Bracket 68 is hollow and is secured to the inboard face of frame portion 12c. Bracket 68 includes upper and lower wall portions 68a and 68b respectively defining elongated slots 68c and 68d and an end wall portion 68e defining a threaded bore 68f. Adjustment screw 70 is threadably received in bore 68f and is movable threadably in a direction paralleling the elongation of slots 68c and 68d.

Adjustment link 72 is pivotally mounted at one end 72a to lever 54 at the juncture between lever portions 54b and 54c and the other free end 72b of link 72 is received in the hollow of bracket 68. A slot 54d in lever 54 allows the end 72a of adjustment link 72 to pass into the hollow interior of the lever; a slot 12f in frame portion 12c allows the lever to pass through the frame portion; and a slot 68g in bracket 68 allows the free end of the link to pass into the hollow interior of the bracket. A pin 74 passes through the end 72b of link 72 for slidable engagement at its upper and lower ends with slots 68c and 68d and the free end 72b of the link abuttingly engages the free end 70a of adjustment screw 70 within the hollow of the bracket.

Disconnect mechanism 20 is movable between its solid line connect or clutch engaged position of FIG. 4 and its dash line disconnect or clutch disengaged position of FIG. 4 in response to pivotal movement of lever 54 by the operator, preferably with the added moment arm provided by movement of handle 56 to its extended position. The pivotal movement of lever 54 is guided and accompanied by simultaneous pivotal movement of adjustment link 72 about its free end 72b. As further seen in FIG. 4, and with the disconnect mechanism in its solid line, clutch engaged position, the loading of the clutch may be varied by movement of screw 70 which acts through link 72, lever 54, and cam head 52 to move cam face 52e incrementally between the solid line clutch engaged position to the chain line positions on either side of the solid line position in which the clutch loading is selectively varied. With the disconnect mechanism in its clutch engaged position, spring 48 acts to maintain collar 58, bearing 60, thrust washer 62, clamp head 52, lever 54, adjustment link 72, and adjustment screw 70 in loaded, mutually abutting engagement irrespective of the position of adjustment of screw 70.

Shaft 24 is journalled at one outboard end 24b in frame end wall 12b and sprocket 18 is keyed to shaft 24 between frame end wall 12b and speed reducer housing side wall 14b. The other outboard end of shaft 24 passes through frame end wall 12c. A nut 74 is threaded onto a threaded shaft portion 24d and coacts with a needle bearing 76 positioned between the nut and the frame end wall 12c to preclude leftward axial movement of the shaft relative to the frame while allowing free rotation of the shaft relative to the frame.

A sprocket wheel 78 is keyed to the outboard end 24c of the shaft and a spring 80 is positioned between sprocket 78 and nut 74 to allow limited axial movement of sprocket 78 on the shaft against the resistance of spring 80.

A solenoid 82 is secured to the upper face of head plate 52b and includes a plunger 84. Plunger 84 is extended in the deenergized state of the solenoid and is adapted when extended to lockingly interengage with the teeth of sprocket 78 to lock shaft 24 against rotation.

In use of the invention operator mechanism, a chain 86, secured at its opposite ends to spaced points on the gate to be operated, is passed around idlers 88 mounted on shafts 90 and around sprocket wheel 18 so that rotation of sprocket 18 in either direction moves the chain 86 in the respective direction to move the gate in the respective direction. The chain 86 is driven by the motor 16 through the speed reducer 14 at a speed and power to provide the desired gate movement. Motor 16 may, for example, comprise a 1 horsepower DC motor, and speed reducer 14 may provide a 20 to 1 speed reduction so that, assuming an 1800 output speed of the motor output shaft, shaft 24 is driven at 90 revolutions per minute which may, by suitable sizing of sprocket 18, be converted to a gate speed of one foot per second.

In the normal, inactive state of the invention operator, disconnect mechanism 20 is in the solid line position of FIG. 4 in which the clutch is engaged; screw 70 is positioned to provide the desired setting at which the clutch will slip in response to hitting an obstacle; and solenoid 82 is deenergized to extend plunger 84 into engagement with tooth wheel 78 to lock shaft 24 and thereby the gate in its instantaneous position. When it is desired to move the gate either in an opening or closing direction, the motor 16 is suitably energized to drive shaft 24 through clutch 32 and move the gate in the desired direction. If the gate hits an obstacle during such movement, the clutch will slip with the point or load at which the clutch slips determined by the particular setting of adjustment screw 70. Solenoid 82 is energized immediately prior to the energization of motor 16 so that plunger 84 is withdrawn from engagement with tooth wheel 78 to allow shaft 74 to be rotated by the motor, and the solenoid is deenergized immediately after deenergization of the motor so as to allow plunger 84 to again assume an extended, interlocking position with respect to sprocket 78 to lock the shaft and thereby the gate in the instantaneous position in which it has been halted. For example, solenoid 82 may be energized to withdraw plunger 84 one or two seconds prior to energization of motor 16 and may be deenergized to reengage plunger 84 one or two seconds after motor 16 is deenergized.

When it is desired to adjust the load at which the clutch will slip, screw 70 is selectably rotated. If the screw is rotated in a tightening or clutch loading direction, the tip 70a of the screw pushes the end 72b of adjustment link 72 with this movement of the link end being guided by the guiding movement of pin 74 in slots 68d and 68e. This movement of adjustment link 72 in turn moves operating lever 54 which in turn pivots cam head 52 about its end 52a, causing cam faces 52e to act on thrust washer 62 and through collar 58 and Belleville washers 48 against the inner race 42 of bearing 28, which in turn acts against the multi-disk clutch to increase the loading as between the pressure plates and friction pads of the clutch to thereby increase the load at which the clutch will slip.

Conversely, if the adjustment screw 70 is moved in a loosening direction, so as to tend to move the free end 70a of the screw away from the end 72b of the adjustment link, spring 48 will act through collar 52, thrust washer 62, cam head 52, and lever 54 to cause the link 72 to follow the retreating adjustment screw with the result that the spring loading in the system is lessened and the loading on the clutch is reduced with the result that the clutch will slip at a lesser applied load.

When it is desired to disconnect the clutch for any reason, such for example as in the case of a power failure, operating lever 54 is moved from its solid line to its dash line position of FIG. 4 to move cam head 52 to its dash line position of FIG. 4 in which it is physically displaced from thrust washer 62 and in which spring 48 is totally relaxed so as to totally unload the clutch. As cam head 52 is moved from its solid line to its dash line position of FIG. 4, solenoid 82 moves with the cam head with the result that plunger 84 is moved out of locking engagement with sprocket 78 so as to allow free rotation of shaft 24 and thereby free movement of the associated gate. Sprocket 78 is mounted for slidable movement on shaft 24 and spring 80 functions to allow the sprocket to move selectively against the resistance of spring 80 to facilitate the engagement and disengagement of plunger 84 from the sprocket wheel.

As noted, the base and frame structure supporting the various operating elements of the gate operator are shown schematically in FIGS. 1–3. A commercial embodiment of a suitable support structure for the invention gate operator is shown in FIG. 7. The support structure of FIG. 7 includes a pair of parallel base members 90 and 92, an end plate 94 positioned between the ends of base members 90 and 92 at the rear end of the operator, a front plate 96 positioned between the base members 90 and 92 at the front end of the operator, a bracket 98 also secured to the front end of the base plates 90 and 92, a bracket 100, a pair of brackets 102 and 104 and a motor bracket 106.

Base plates 90 and 92 include a lower flange 90a, 92a including means for securing the operator to a suitable support surface, an upper horizontal flange 90b, 92b, and an upper vertical flange 90c, 92c. End plate 94 has a generally U-shaped configuration and is suitably secured between base members 90 and 92 at the rear of the operator. Plate member 96 is positioned between the base plates 90 and 92 at the front end of the operator and includes a main body portion 96a and angled side reinforcing portions 96b positioned within and suitably secured to base members 90 and 92. Bracket 98 has a generally Z configuration and includes a lower vertical portion 98a suitably secured to the front end of base members 90 and 92, a horizontal portion 98b and a vertical portion 98g extending upwardly in spaced relation to main body portion 96a of front plate 96. Bracket 100 has a Z configuration and includes a lower vertical portion 100a positioned between flanges 90c and 92c a horizontal portion 100b extending forwardly from vertical portion 100a and a vertical portion 100c extending upwardly from horizontal portion 100b.

Brackets 102 and 104 have a U configuration and are positioned rigidly between front plate vertical portion 96a and bracket portion 100c. Weld plates 108 (only one of which is shown) may also be provided at the intersection of brackets 102 and bracket portion 100c to reinforce the structure.

Speed reducer unit 14 is positioned between brackets 102 and 104 and suitably secured thereto by appropriate fastening devices, and bracket 106 is secured to motor 16 and is further suitably secured to a control box 110 shown in dotted lines in FIG. 7. Control box 110 sits at the rear of the operator on base member flange portions 90b, 92b and between base member flange portions 90c, 92c and is suitably secured at its forward face to the vertical flange 100a of bracket 100. It will be seen that vertical flange portion 100c of bracket 100 constitutes the support plate for disconnect mechanism 20 and adjustment mechanism 22 and that the vertical flange portion 98c of bracket 98 constitutes the forward support for shaft 24 as well as providing the support for the shafts supporting the idler sprockets 88. The bolts 112 fastening brackets 102 and 104 to front plate 96 pass through the front plate 96 and through flange portion 98c and spacers 114 are positioned over bolts 112 to provide rigidity as between front plate 96 and bracket portion 98c. It will be understood that a cover, not shown, will be provided to fit over the illustrated components of the gate operator so as to provide a neat, box-like appearance.

The invention operator mechanism will be seen to have many important advantages. Specifically, the overall packaging of the mechanism is greatly improved as compared to prior art mechanisms employing belts and pulleys. Further, the maintenance requirements of the mechanism are greatly reduced by the use of the sealed speed reducer and clutch assembly. Further, the overall appearance of the unit is greatly improved as compared to the prior art belt and pulley mechanism. Further, adjustment screw 70, since it is disassociated from the rotational movement of shaft 24, may be adjusted while the operator mechanism is powered and the gate is moving, thereby to allow the adjustment to be made as the gate is operating to directly achieve the desired clutch operating characteristics rather than approximating a clutch setting with the gate deenergized and then testing the gate to see if the approximated setting is satisfactory. Further, the invention operator mechanism provides an extremely effective quick disconnect mechanism which operates to quickly and effectively disengage the clutch whether the gate is moving or stationary. Further, the package size is optimized and the operation is simplified by the use of a common clutch operator member which is moved in a macro sense to engage and disengage the clutch and in a micro sense to adjust the clutch. Further, the specific load at which the clutch is adjusted to slip will not be effected by the operation of the disconnect mechanism since the setting of adjustment screw 70 is not effected by the operation of the disconnect mechanism so that the clutch loading corresponding to the screw setting is re-established upon return of the disconnect mechanism to its connected position.

Whereas a preferred embodiment of the invention has been illustrated and described in detail, it will be apparent that various changes may be made in the disclosed embodiment without departing from the scope or spirit of the invention.

We claim:

1. An operator mechanism for a gate comprising:
   A. an electric motor;
   B. a drive shaft driven by said motor;
   C. a drive member on said drive shaft for driving the gate;
   D. a clutch interposed between said motor and said drive shaft;
   E. a clutch operator member operative in response to macro movement thereof to engage and disengage said clutch and operative in response to micro movement thereof with the clutch engaged to adjust the load at which said clutch slips;

F. disconnect means operative to impart macro movement to said operator member to engage and disengage said clutch; and G. adjustment means including a selectively movable adjustment member remote from said clutch and from said clutch operator member and operative independently of the operation of said disconnect means and in response to selective movement of said adjustment member to impart micro movement to said operator member proportionate to the movement of said adjustment member to selectively adjust the load at which the engaged clutch slips.

2. An operator mechanism according to claim 1 wherein:

H. said clutch comprises a multi-disk assembly including a plurality of annular pressure plates mounted concentrically on and keyed to said drive shaft and a plurality of annular friction disks interposed between said pressure plates; and I. said operator member comprises a collar mounted on said drive shaft and movable axially on said drive shaft to variably load said friction disks relative to said pressure plates.

3. An operator mechanism according to claim 2 wherein:

J. said clutch further includes a wheel rotatably mounted on said drive shaft in interposed relation to said pressure plates and said friction disks and driven by said motor.

4. An operator mechanism according to claim 3 wherein:

K. said wheel comprises a worm wheel; and

L. said motor includes an output shaft which drives a worm gear drivingly engaging said worm wheel.

5. An operator mechanism according to claim 4 wherein:

M. said worm wheel is part of a speed reducer unit further including a speed reducer housing;

N. said drive shaft extends through said housing with its opposite ends positioned outboard of said housing;

O. said multi-disk clutch assembly is positioned within said housing;

P. said drive member comprises a drive sprocket positioned on said one end of said drive shaft outboard of said housing; and Q. said collar is mounted on the other end of said drive shaft outboard of said housing.

6. An operator mechanism according to claim 5 wherein:

R. said speed reducer unit includes a bearing member in a side wall thereof passing and journalling said drive shaft and including a race mounted for axial movement on said shaft; and S. said operator mechanism further includes spring means on said shaft between the inboard face of said collar and the outboard face of said bearing member race and operative to urge the inboard face of said race against said multi-disk clutch assembly positioned within said speed reducer housing.

7. An operator mechanism according to claim 2 wherein:

K. said disconnect means includes an operating lever operative to impart said macro movement to said collar to engage and disengage said clutch; and L. said adjustment means comprises an adjustment screw operative to impart said micro movement to said collar to adjust said clutch.

8. An operator mechanism according to claim 7 wherein:

M. said disconnect means further includes a clamp head adapted to engage said collar and mounted for pivotal movement between a clutch engaged and a clutch disengaged position; and N. said operating lever is pivoted at one end to said clamp head and is operative to pivot said clamp head between its clutch engaged and clutch disengaged positions.

9. An operator mechanism according to claim 8 wherein:

O. said adjustment means further includes an adjustment link pivotally connected at one end thereof to said operating lever intermediate the ends of said operating lever;

P. said adjustment screw engages the other end of said adjustment link; and

Q. rotation of said adjustment screw moves said one end of said adjustment link which in turn moves said operating lever which in turn pivots said clamp head which in turn moves said collar, whereby said clutch is adjusted.

10. An operator mechanism according to claim 9 wherein:

R. said other end of said adjustment link includes a pin guiding in a slot extending parallel to the line of action of said adjustment screw.

11. An operator mechanism according to claim 10 wherein:

S. said slot is defined in one wall of a hollow bracket; and

T. said other end of said link extends into the hollow of said bracket with said pin guiding in said slot.

12. An operator mechanism according to claim 11 wherein:

U. said screw is threadably received in a threaded bore in another wall of said bracket and extends into the hollow of said bracket for abutting engagement with said other end of said adjustment link.

13. An operator mechanism according to claim 1 wherein:

H. said operator mechanism further includes a toothed member mounted on said drive shaft and a solenoid having a plunger movable into locking interengagement with said toothed member; and I. said plunger is moved axially out of engagement with said toothed member in response to said macro movement of said operator member in a clutch disengage direction.

14. An operator mechanism according to claim 13 wherein:

J. said operator member comprises a collar on said drive shaft;

K. said disconnect means includes a clamp head adapted to engage said collar; and L. said solenoid is mounted on said clamp head.

15. An operator mechanism for a gate comprising:

A. an electric motor having a worm gear output shaft;

B. a speed reducer unit including a worm wheel driven by said worm gear and a drive shaft passing rotatably and concentrically through said worm wheel;

C. clutch means interconnecting said worm wheel and said drive shaft and including a plurality of discs rotatably mounted on said drive shaft and drivingly connected to said worm wheel and a plurality of further discs slidably mounted on and drivingly connected to said drive shaft;

D. a drive member on one end of said drive shaft; and

E. a clutch operator member mounted for axial sliding movement on the other end of said drive shaft and operative in response to axial sliding movement on said drive shaft to selectively engage and disengage said clutch means.

16. An operator mechanism according to claim 15 wherein:

F. said speed reducer unit includes a housing;

G. said drive shaft extends through said housing with said one end thereof, mounting said drive member, positioned outboard of one exterior side wall of said housing and said other end thereof, mounting said clutch operator member, positioned outboard of an opposite exterior side wall of said housing; and H. said disks are positioned within said housing between said side walls in concentric relation to said drive shaft.

17. An operator mechanism for a gate comprising:

A. an electric motor having a worm gear output shaft;

B. a speed reducer unit including a worm wheel driven by said worm gear and a drive shaft passing rotatably and concentrically through said worm wheel;

C. clutch means interconnecting said worm wheel and said drive shaft;

D. a drive member on one end of said drive shaft;

E. a clutch operator member mounted for axial movement on the other end of said drive shaft and operative in response to axial movement on said drive shaft to selectively engage and disengage said clutch means;

F. said speed reducer unit including a housing;

G. said drive shaft extending through said housing with one end thereof, mounting said drive member, positioned outboard of one exterior side wall of said housing and said other end thereof, mounting said clutch operating member, positioned outboard of an opposite exterior side wall of said housing;

H. said clutch means including a multi-disk clutch assembly positioned within said housing between said side walls in concentric relation to said drive shaft;

I. said speed reducer unit further including a bearing member in said opposite exterior side wall passing and journaling said drive shaft and including a race mounted for axial movement on said shaft;

J. said operator member comprising a collar mounted on said other end of said shaft outboard of said opposite exterior side wall; and K. said operator mechanism further including spring means on said drive shaft between the inboard face of said collar and the outboard face of said race and operative to urge the inboard face of said race against said multi-disk clutch assembly positioned within said speed reducer housing.

18. An operator mechanism according to claim 17 wherein:

L. said operator mechanism further includes
  1. disconnect means operative to impart macro movement to said collar to engage and disengage said clutch and
  2. adjustment means operative independently of the operation of said disconnect means to impart micro movement to said collar to adjust the load at which the engaged clutch slips.

19. An operator mechanism according to claim 18 wherein:

M. said disconnect means includes an operating lever operative to impart said macro movement to said collar to engage and disengage said clutch; and N. said adjustment means comprises an adjustment screw operative to impart said micro movement to said collar to adjust said clutch.

20. An operator mechanism according to claim 19 wherein:

O. said disconnect means further includes a clamp head adapted to engage said collar and mounted for pivotal movement between a clutch engaged and a clutch disengaged position; and P. said operating lever is pivoted at one end to said clamp head and is operative to pivot said clamp head between its clutch engaged and clutch disengaged positions.

21. An operator mechanism according to claim 20 wherein:

Q. said operator mechanism further includes an adjustment link pivotally connected at one end thereof to said operating lever intermediate the ends of said operating lever;

R. said adjustment screw engages the other end of said adjustment link; and

S. rotation of said adjustment screw moves said one end of said adjustment link which in turn moves said operating lever which in turn pivots said clamp head which in turn moves said collar, whereby said clutch is adjusted.

22. An operator mechanism according to claim 21 wherein:

T. said other end of said adjustment link includes a pin guiding in a slot extending parallel to the line of action of said adjustment screw.

23. An operator mechanism according to claim 22 wherein:

U. said slot is defined in one wall of a hollow bracket; and

V. said other end of said link extends into the hollow of said bracket with said pin guiding in said slot.

24. An operator mechanism according to claim 23 wherein:

W. said screw is threadably received in a threaded bore in another wall of said bracket and extends into the hollow of said bracket for abutting engagement with said other end of said adjustment link.

* * * * *